March 16, 1965     W. J. REINHARDT ETAL     3,173,696
RIGID COMPOSITE LABYRINTH SEAL FOR HIGH SPEED ROCKET TURBOPUMPS
Filed June 9, 1960

INVENTORS:
Arthur L. Way & William J. Reinhardt,
BY
William R. Wright
Agent

United States Patent Office 3,173,696
Patented Mar. 16, 1965

3,173,696
RIGID COMPOSITE LABYRINTH SEAL FOR HIGH
SPEED ROCKET TURBOPUMPS
William J. Reinhardt, Sparta, and Arthur L. Way, Denville, N.J., assignors to Thiokol Chemical Corporation, Bristol, Pa., a corporation of Delaware
Filed June 9, 1960, Ser. No. 35,061
1 Claim. (Cl. 277—53)

This invention relates in general to fluid sealing means for the relatively rotating parts of hydraulic apparatus such as the impeller and casing of a centrifugal pump, and has particularly reference to a wear ring of improved construction and composition intended expressly for use in connection with high-speed rocket turbopumps to increase the sealing efficiency and reduce the hazards incident to the pumping of highly inflammable and explosive liquid fuel components thereby.

In a rocket turbopump, in addition to maintenance of desirable pumping efficiency, sealing means for the wearing of surfaces of the rotating impeller and stationary casing which are of the labyrinth type and insure very close clearances are essential because they prevent leakage of spontaneously ignitable propellants and danger of fires and explosion in the pump compartment. On the other hand, when the wearing surfaces of the impeller and casing are both metallic, maintenance of close clearances can result in dangerous rubbing when thermal contraction or expansion of the metallic relatively rotatable parts occurs. For instance, when pumping characteristically cold liquid oxygen, shrinking of metallic sealing means can eliminate safe clearances.

It, therefore, is the primary object of our present invention to provide a wear ring of novel construction which can cooperate with a mated metallic seal element in such a manner that rubbing between the opposed wearing surfaces cannot cause fires or explosions.

To be more explicit, we provide, for cooperation with one seal element having a generally cylindrical wearing surface, a wear ring which includes in its structure plural coaxial plastic rings of axial thinness that are arranged in edgewise close clearance relation to the cylindrical wearing surface of the first-mentioned seal element to form a labyrinth. In the use of a wear ring of this construction and composition, the plastic rings can shrink into actual contact with the opposed metallic wearing surface without danger of fire or explosion because the plastic material has a lower coefficient of friction than that of metal.

Another object is to provide a wear ring having plastic wearing surfaces which is of novel composite construction that includes metallic supporting and reinforcing means to insure rigidity and form retention under the trying conditions of operational use.

Further objects, advantages and features of the invention will become apparent as the following specific description is read in connection with the accompanying drawing, in which.

Figure 1:
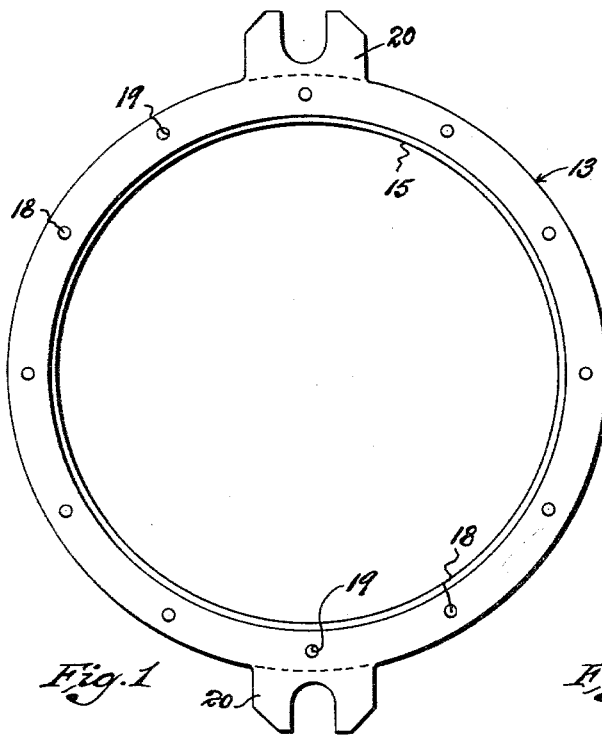
FIG. 1 is a side elevational view of a wear ring constructed in accordance with the invention.
Figure 2:
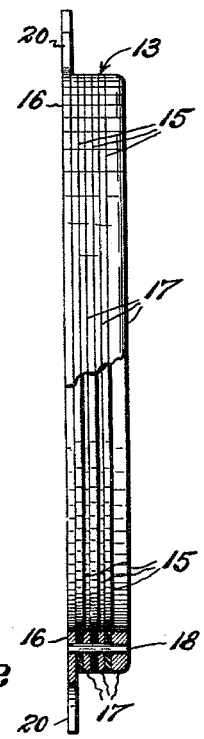
FIG. 2 is a front or edge elevation.
Figure 3:
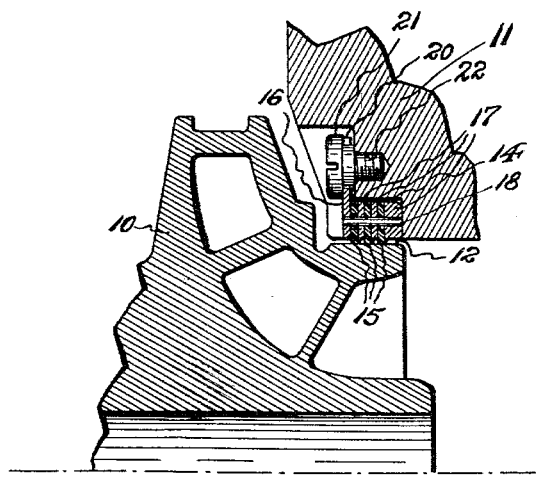
FIG. 3 is a fragmentary axial sectional view of one of the wear rings as applied to the stationary casing and rotatable impeller of a rocket turbopump.

Referring now in detail to the drawing, wherein like reference characters designate corresponding parts in the several views, the numeral 10 refers to the impeller which is one of the principal structural components of a rocket turbopump and is rotatably mounted in the other principal component, the stationary casing 11. In this illustrative embodiment of the invention, impeller component 10 has an outer peripheral wearing surface 12 of circular radial cross-section and preferably generally cylindrical as shown, which for convenience of later reference will be termed a "first fluid seal element." For operative cooperation with first fluid seal element 12, our improved wear ring 13 is shown as being mounted on an annular seating shoulder 14 of turbopump casing component 11 in coaxial encircling relation to said first fluid seal element 12. Therefore, it is appropriate to call wear ring 13 a "second fluid seal element." However, it is to be understood to be within the spirit of our invention to employ an equivalent reverse arrangement (not shown) of first and second fluid seal elements in which the wear ring 13 constituting the second fluid seal element is mounted on the impeller component 10 of the turbopump instead of on casing component 11. In this alternative embodiment, wearing surface 12, which constitutes the first fluid seal element, will be provided on casing component 11 in encircling relation to second fluid seal element 13.

As previously explained in the preamble to this specification, it is an object of our present invention to provide wear ring 13 with plastic wearing surfaces for close-clearance opposition to first fluid seal element 12 while at the same time providing a labyrinth type seal. We accomplish this and insure adequate strength for utilization in a high-speed rocket turbopump by the fabrication of a composite wear ring structure. The labyrinth feature is effected by arranging plural axially flat and thin plastic wear rings proper 15 in coaxial and axially spaced relation. These wear rings proper 15 are of uniform inside and outside diameter in the presently preferred generally cylindrical embodiment of the invention illustrated in FIG. 1 and are intended to be mounted with their inner peripheral edges presented radially toward cylindrical first fluid seal element 12.

Plastic wear rings proper 15 are supported rigidly in their relative positions just described by sandwiching them between metallic outer face rings 16—16 and by interposing metallic spacer rings 17 between adjacent wear rings proper 15 in the alternate arrangement of plastic and metallic rings shown. In the preferred embodiment, all of the metallic rings 16 and 17 are of the same outside diameter as plastic wear rings proper 15, but the inside diameter of the latter is considerably less than that of the metal rings to insure the positioning of all metal surfaces safely radially remote from contact with the metallic wearing surface of first fluid seal element 12. The rigidity of the support for wear rings proper 15 is further insured by fitting metallic reinforcing pins 18 in a circumferential row of axial through holes 19 provided in all of the rings 15, 16 and 17, and also by bonding the said rings in an integral structure by epoxy.

The choice of materials for the composition of metal rings 16 and 17 and plastic rings 15 is governed by the rule that any of these materials must be compatible with the fluids to be pumped by a rocket turbopump. A metal that satisfies that requirement with most liquid fuels is aluminum alloy, and the same is true of certain fluorinated hydrocarbon compounds examples of which are Teflon (tetrafluoroethylene) and Kel–F (trifluorochloroethylene) for use in construction of plastic rings 15. Another normally compatible metal is stainless steel. Either of the plastic materials just mentioned has a lower coefficient of friction than the metal of which wearing face 12 of the first fluid seal element is composed, so ignition of the liquid propellents being pumped cannot occur in the event of rubbing contact between the first and second fluid seal elements, such as could be caused by the shrinking effect of liquid oxygen.

The use of plastic material in composition of wear rings proper 15 makes it possible to maintain the close wearing ring clearances required for better pump efficiency, without the danger of fire and/or explosion from rubbing metallic parts in the presence of high energy liquid propellants. The fire and/or explosion may be caused by the rubbing metallic parts creating sparks and/or the heat of friction. Furthermore, the addition of metallic rings 16 and 17, helps to retain the plastic rings in position and gives radial and axial support to them, and prevents the collapse of the thin labyrinth-forming rings 15.

For ease of removable installation of composite wear ring 13 in casing 11, the face ring 16 which will be located innermost is shown as being provided with circumferentially spaced pairs of radially projecting lugs 20 to straddle retaining screws 21 that are removably engaged with axial tapped holes 22 in said casing. It is to be understood, however, that we do not intend to be limited to any particular type of attaching means.

In tests involving use of our improved composite wear rings 13, there was indication of a leakage of only 5 percent of the design flow at a head rise of about 2150 feet as compared with tests of a conventional solid wear ring which indicated a leakage of 65% at the same head. This sealing efficiency with the close clearances maintained is particularly significant when unattended by any hazard of fire or explosion.

While there have been shown and described and pointed out the fundamental novel features of this invention as applied to a single structural embodiment, it will be understood that various omissions and substitutions and changes in the form and details of the device illustrated may be made by those skilled in the art without departing from the spirit of the invention. It is the intention, therefore, to be limited only as indicated by the scope of the following claim.

We claim:

A fluid sealing means for hydraulic pumping apparatus such as a high-speed rocket turbopump including a principal stationary casing component and a principal rotary impeller component, which sealing means comprises, in combination, a first seal element having a metallic wearing surface of circular cross-section provided on one of said principal components in coaxial relation to the rotational axis of the impeller component; a second seal element in the form of a composite wear ring compatible with the fluid being pumped having means for mounting on the other of said principal components in coaxial relation to said first seal element and including plural, flat, axially spaced labyrinth-forming wear rings proper arranged with peripheral edge faces thereof presented toward the wearing surfaces of said first seal element and spaced therefrom with close radial clearances; the wear rings proper of said second seal element being composed of a plastic material of the type formed of fluorinated hydrocarbon compounds and having a lower coefficient of friction than the metallic wearing surface of said first seal element; said means mounted on one of said principal components fixedly supporting the plastic wear rings proper of said second seal element axially and radially and fixedly maintaining them in axially spaced relation; said mounting means being radially spaced from the wearing surface of said first seal element further than the peripheral edge faces of the plastic wear rings proper of said second seal element; said fixedly mounting means comprising plural metallic spacer and axially outer face rings of greater internal diameter than said plastic wear rings proper and arranged in alternate coaxial relation to said plastic wear rings proper; all of said rings including a plurality of aligned, circumferentially spaced apertures defining axial bores, and a reinforcing metal pin inserted in said bores, said plastic and metallic rings being bonded together to rigidly unite them.

References Cited by the Examiner
UNITED STATES PATENTS

| | | | |
|---|---|---|---|
| 1,006,714 | 10/11 | Bell | 286—10 |
| 2,571,560 | 10/51 | Gall. | |
| 2,616,735 | 11/52 | Walker | 277—185 |
| 2,740,648 | 4/56 | Amblard | 277—81 |
| 2,774,621 | 12/56 | Kilbourne | 277—209 |
| 2,809,130 | 10/57 | Rappaport. | |
| 2,817,544 | 12/57 | Von Der Nuell | 277—123 |
| 2,860,827 | 11/58 | Egli | 230—116 |
| 2,882,083 | 4/59 | Palumbo et al. | 277—204 X |

FOREIGN PATENTS

| | | |
|---|---|---|
| 260,886 | 11/26 | Great Britain. |

EDWARD V. BENHAM, *Primary Examiner.*

CORNELIUS D. ANGEL, SAMUEL ROTHBERG,
*Examiners.*